United States Patent
Uneura et al.

(10) Patent No.: US 10,352,232 B2
(45) Date of Patent: Jul. 16, 2019

(54) TURBOCHARGER AND TURBOCHARGER OIL SUPPLY SYSTEM

(71) Applicant: IHI Corporation, Koto-ku (JP)

(72) Inventors: Yutaka Uneura, Tokyo (JP); Yuichi Daito, Tokyo (JP); Hideyuki Kojima, Tokyo (JP); Tomomi Sugiura, Tokyo (JP)

(73) Assignee: IHI Corporation, Koto-ku (JP)

( * ) Notice: Subject to any disclaimer, the term of this patent is extended or adjusted under 35 U.S.C. 154(b) by 213 days.

(21) Appl. No.: 15/233,063

(22) Filed: Aug. 10, 2016

(65) Prior Publication Data

US 2016/0348577 A1    Dec. 1, 2016

Related U.S. Application Data

(63) Continuation of application No. PCT/JP2015/061587, filed on Apr. 15, 2015.

(30) Foreign Application Priority Data

Apr. 30, 2014 (JP) .................................. 2014-093745

(51) Int. Cl.
 *F02B 39/14* (2006.01)
 *F01D 25/20* (2006.01)
 (Continued)

(52) U.S. Cl.
 CPC .............. *F02B 39/14* (2013.01); *F01D 25/20* (2013.01); *F02B 33/00* (2013.01); *F16C 27/02* (2013.01);
 (Continued)

(58) Field of Classification Search
 CPC .......... F02B 39/00; F02B 39/14; F01D 25/16; F01D 25/18; F01D 25/20; F02C 7/06;
 (Continued)

(56) References Cited

U.S. PATENT DOCUMENTS

| 2009/0196743 A1* | 8/2009 | Ueno .................... F01D 11/003 |
| | | 415/174.5 |
| 2011/0158803 A1* | 6/2011 | Sebald .................... F01D 25/16 |
| | | 415/229 |

(Continued)

FOREIGN PATENT DOCUMENTS

| JP | 44-11531 | 5/1969 |
| JP | 60-6838 U | 1/1985 |
| JP | 2000-87753 | 3/2000 |
| JP | 2012-193709 | 10/2012 |
| JP | 2013-19323 | 1/2013 |

(Continued)

OTHER PUBLICATIONS

Office Action dated Jun. 6, 2017 in Japanese Patent Application No. 2016-515929.

(Continued)

*Primary Examiner* — Patrick D Maines
*Assistant Examiner* — Dapinder Singh
(74) *Attorney, Agent, or Firm* — Oblon, McClelland, Maier & Neustadt, L.L.P.

(57) ABSTRACT

A turbocharger includes: a shaft provided with a small-diameter portion, and two large-diameter portions formed on two sides of the small-diameter portion; and a semi-floating bearing to rotatably support the shaft. The semi-floating bearing includes a cylindrical body into which the shaft is inserted. An inner peripheral surface of the body includes: two bearing surfaces opposed to the large-diameter portions of the shaft; a non-bearing surface located between the two bearing surfaces, having a larger inner diameter than inner diameters of the bearing surfaces; and an oil passage opened to the non-bearing surface to supply lubricant oil to a gap in a radial direction between the non-bearing surface and the shaft. At least one of the two bearing surfaces extends more in an approaching direction of the two bearing surfaces than does the large-diameter portion opposed in the radial direction to the one bearing surface.

15 Claims, 4 Drawing Sheets

(51) Int. Cl.
*F16C 27/02* (2006.01)
*F02B 37/00* (2006.01)
*F02B 33/00* (2006.01)
*F16C 32/06* (2006.01)
*F16C 17/02* (2006.01)

(52) U.S. Cl.
CPC ...... *F16C 32/0644* (2013.01); *F16C 32/0659* (2013.01); *F02B 37/00* (2013.01); *F05D 2220/40* (2013.01); *F05D 2240/14* (2013.01); *F05D 2240/50* (2013.01); *F05D 2260/98* (2013.01); *F16C 17/02* (2013.01); *F16C 2360/00* (2013.01); *F16C 2360/24* (2013.01)

(58) Field of Classification Search
CPC .......... F16C 17/02; F16C 17/10; F16C 23/04; F16N 7/38; F16N 13/00; F16N 39/06
USPC ................................................ 60/602, 605.2
See application file for complete search history.

(56) References Cited

U.S. PATENT DOCUMENTS

2012/0237149 A1* 9/2012 Uesugi ................. F01D 25/166
384/397
2014/0127051 A1 5/2014 Takahashi et al.

FOREIGN PATENT DOCUMENTS

| JP | 2013-245663 | 12/2013 |
|---|---|---|
| JP | 2014-9622 A | 1/2014 |
| JP | 2014-47700 | 3/2014 |
| JP | 2014-51898 | 3/2014 |

OTHER PUBLICATIONS

International Search Report dated Jul. 14, 2015 in PCT/JP2015/061587, filed on Apr. 15, 2015 (with English Translation).
Written Opinion dated Jul. 14, 2015 in PCT/JP2015/061587, filed on Apr. 15, 2015.

\* cited by examiner

TURBOCHARGER AND TURBOCHARGER OIL SUPPLY SYSTEM

CROSS REFERENCE TO RELATED APPLICATIONS

This application is a continuation application of International Application No. PCT/JP2015/061587, filed on Apr. 15, 2015, which claims priority to Japanese Patent Application No. 2014-093745, filed on Apr. 30, 2014, the entire contents of which are incorporated by reference herein.

BACKGROUND

1. Technical Field

The present disclosure relates to a turbocharger in which a shaft is rotatably supported by a semi-floating bearing, and to a turbocharger oil supply system.

2. Description of the Related Art

There has heretofore been known a turbocharger in which a turbine shaft is rotatably supported by a bearing housing. The turbine shaft is provided with a turbine wheel on one end and a compressor wheel on the other end.

The turbocharger thus configured is connected to an engine, then the turbine wheel is rotated by exhaust gas discharged from the engine, and the compressor wheel is rotated through the turbine shaft by the rotation of the turbine wheel. Thus, the turbocharger compresses air along with the rotation of the compressor wheel and sends the compressed air out to the engine.

A bearing hole is formed in the bearing housing and a bearing is placed in the bearing hole. The bearing has an insertion hole into which the turbine shaft is inserted. A bearing surface to be subjected to a radial load is formed on an inner peripheral surface of the insertion hole. The turbocharger described in Japanese Patent Application Laid-Open Publication No. 2012-193709 is provided with a semi-floating bearing which is of a type of the aforementioned bearing and is restrained from moving in a rotational direction of the turbine shaft.

SUMMARY

Lubricant oil for lubricating the semi-floating bearing is deprived of foreign substances by use of a filter, yet still has a risk of contamination by microscopic foreign substances. If the above-mentioned lubricant oil contaminated by the microscopic foreign substances is supplied to the semi-floating bearing, the foreign substances are likely to intrude into the bearing surface of the semi-floating bearing.

An object of the present disclosure is to provide a turbocharger and a turbocharger oil supply system, which are capable of inhibiting foreign substances that contaminate lubricant oil from intruding into a bearing surface, and improving a performance to repel the foreign substances.

A first aspect of the present disclosure is a turbocharger including: a turbocharger body; a shaft housed in the turbocharger body and provided with wheels on two ends of the shaft, the shaft including a small-diameter portion, and two large-diameter portions formed on two sides in a direction of a rotation axis of the small-diameter portion, respectively, and each having a larger diameter than a diameter of the small-diameter portion; and a semi-floating bearing including a body of a cylindrical shape into which the shaft is to be inserted, two bearing surfaces formed on an inner peripheral surface of the body, opposed to the large-diameter portions of the shaft, and configured to rotatably support the shaft, a non-bearing surface formed on the inner peripheral surface of the body, located between the two bearing surfaces, and having a larger inner diameter than inner diameters of the bearing surfaces, and an oil passage opened to the non-bearing surface and configured to supply lubricant oil to a gap in a radial direction between the non-bearing surface and the shaft, such that the lubricant oil supplied to the gap lubricates the two bearing surfaces. At least one of the two bearing surfaces extends more in an approaching direction of the two bearing surfaces than the large-diameter portion opposed in the radial direction to the one bearing surface extends.

Each large-diameter portion may include: a tapered portion continuously formed from a boundary portion with the small-diameter portion, the tapered portion having an outer diameter gradually increasing while receding from the small-diameter portion; and a parallel portion continuously formed from the tapered portion, the parallel portion having an outer diameter equal to a maximum diameter of the tapered portion. A bearing groove may be formed on the one bearing surface extending more in the approaching direction than the large-diameter portion opposed in the radial direction to the one bearing surface extends. The bearing groove may have one end located on an end portion side in a receding direction of the two bearing surfaces, and another end located on an end portion side in the approaching direction. The bearing groove may extend beyond the parallel portion of the large-diameter portion in the approaching direction.

A non-groove portion may be formed on the bearing surface extending more in the approaching direction than the large-diameter portion opposed in the radial direction to the one bearing surface extends, and the non-groove portion may be adjacent to the other end of the bearing groove and being flush with the bearing surface.

A groove may be formed on a region in the one bearing surface extending more in the approaching direction than the large-diameter portion opposed in the radial direction to the one bearing surface extends, the region extending in the approaching direction beyond the parallel portion of the large-diameter portion opposed in the radial direction to the one bearing surface. The groove may be recessed in the radial direction from an inner peripheral surface of the semi-floating bearing and may extend in a circumferential direction of the semi-floating bearing.

A groove may be formed on the non-bearing surface. The groove may be recessed in the radial direction from an inner peripheral surface of the semi-floating bearing, and may extend in a circumferential direction of the semi-floating bearing.

A collar configured to be rotated integrally with the shaft may be provided on a side of at least one end surface of two end surfaces in the direction of the rotation axis of the semi-floating bearing. The collar may be opposed to the one end surface. The semi-floating bearing may be subjected to a thrust load from the shaft through the collar.

A second aspect of the present disclosure is a turbocharger oil supply system including: a reservoir unit configured to reserve lubricant oil; a pump configured to send the lubricant oil out of the reservoir unit; a filter unit configured to remove a foreign substance from the lubricant oil sent out by the pump; a turbocharger to which the lubricant oil deprived of the foreign substance by the filter unit is to be supplied; and a valve configured to open and close an oil passage configured to supply the lubricant oil sent out by the pump to the turbocharger while bypassing the filter unit. The turbocharger includes: a turbocharger body; a shaft housed in the turbocharger body and provided with wheels on two ends of the shaft, the shaft including a small-diameter portion, and two large-diameter portions formed on two sides in a direction of a rotation axis of the small-diameter portion, respectively, and each having a larger diameter than a diameter of the small-diameter portion; and a semi-floating bearing including a body of a cylindrical shape into which the shaft is to be inserted, two bearing surfaces formed on an inner peripheral surface of the body, opposed to the large-diameter portions of the shaft, and configured to rotatably support the shaft, a non-bearing surface formed on the inner peripheral surface of the body, located between the two bearing surfaces, and having a larger inner diameter than inner diameters of the bearing surfaces, and an oil passage opened to the non-bearing surface and configured to supply the lubricant oil to a gap in a radial direction between the non-bearing surface and the shaft, such that the lubricant oil supplied to the gap lubricates the two bearing surfaces. At least one of the two bearing surfaces extends more in an approaching direction of the two bearing surfaces than the large-diameter portion opposed in the radial direction to the one bearing surface extends.

According to the present disclosure, it is possible to inhibit foreign substances that contaminate lubricant oil from intruding into a bearing surface, and to improve a performance to repel the foreign substances.

DESCRIPTION OF THE EMBODIMENTS

An embodiment of the present disclosure will be described below in detail with reference to the accompanying drawings. It is to be noted that dimensions, materials, other specific numerical values, and the like shown in the embodiment are mere examples for facilitating understanding of the disclosure and are not intended to limit the scope of the present disclosure unless otherwise specifically stated. Moreover, in the specification and the drawings, elements having substantially the same functions and/or configurations are denoted by the same reference signs and overlapping explanation will thus be omitted. Furthermore, illustration of elements not directly related to the present disclosure will be omitted.

Figure 1:
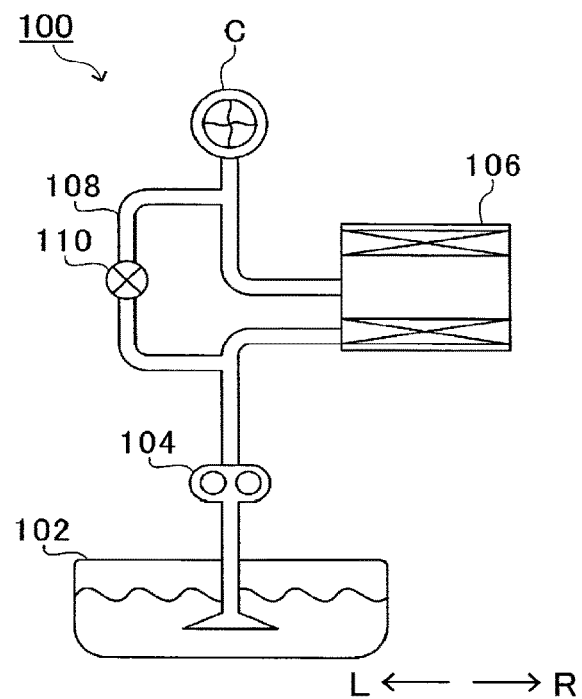
FIG. 1 is a conceptual diagram showing an outline of a turbocharger oil supply system according to an embodiment of the present disclosure.

FIG. 1 is a conceptual diagram showing an outline of a turbocharger oil supply system 100. As shown in FIG. 1, the turbocharger oil supply system 100 includes a reservoir unit 102 configured to reserve lubricant oil. The reservoir unit 102 is formed from an oil pan, for example.

A pump 104 sends the lubricant oil out of the reservoir unit 102. A filter unit 106 removes foreign substances from the lubricant oil sent out of the reservoir unit 102 by the pump 104. Then, the lubricant oil deprived of the foreign substances by the filter unit 106 is supplied to a turbocharger C. The turbocharger C will be described later.

Meanwhile, the turbocharger oil supply system 100 is provided with an oil passage 108. In case a failure occurs in the filter unit 106, the oil passage 108 supplies the lubricant oil sent out by the pump 104 to the turbocharger C while bypassing the filter unit 106. The oil passage 108 is equipped with a valve 110 to open and close the oil passage 108. The valve 110 remains closed while the filter unit 106 functions normally.

Figure 2:
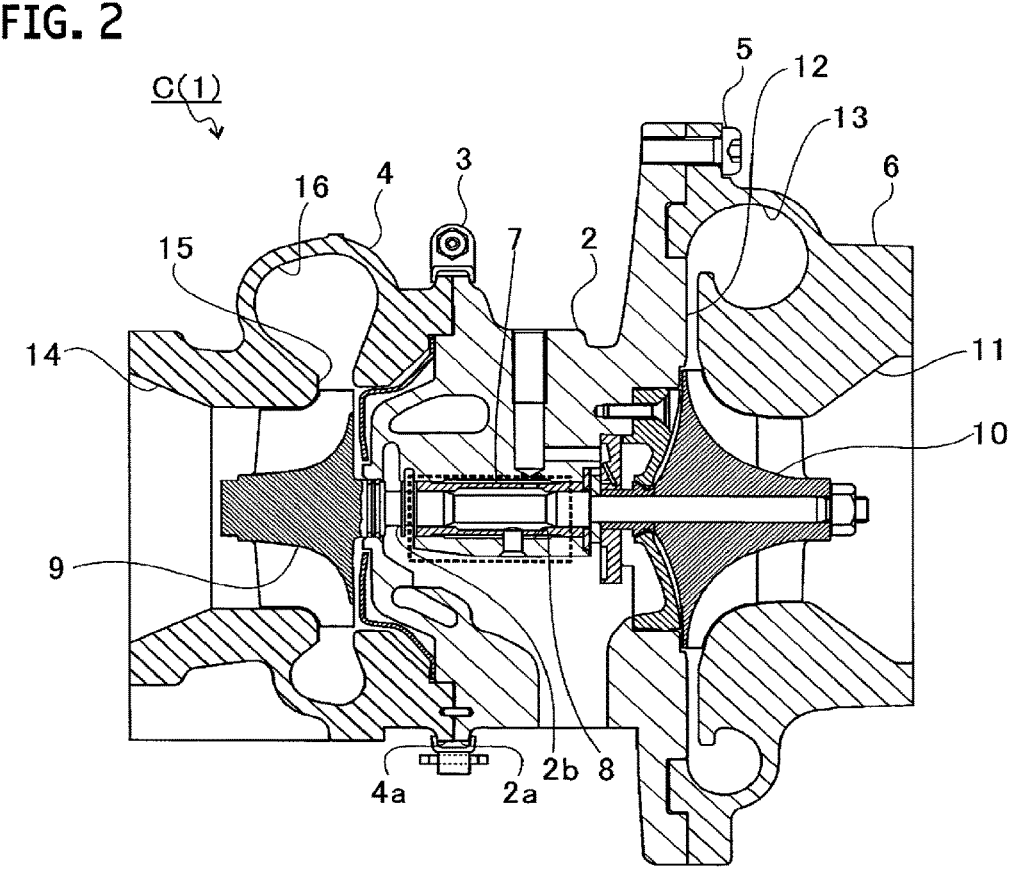
FIG. 2 is a schematic cross-sectional view of a turbocharger according to the embodiment of the present disclosure.

FIG. 2 is a schematic cross-sectional view of the turbocharger C. The following description will be given on the premise that an arrow L shown in FIG. 2 is a direction indicating a left side of the turbocharger C while an arrow R shown therein is a direction indicating a right side of the turbocharger C. As shown in FIG. 2, the turbocharger C includes a turbocharger body 1. The turbocharger body 1 includes a bearing housing 2, a turbine housing 4 connected to the left side of the bearing housing 2 by using a fastening mechanism 3, and a compressor housing 6 connected to the right side of the bearing housing 2 by using a fastening bolt 5, all of which are integrated together.

A protrusion 2a is provided on an outer peripheral surface in the vicinity of the turbine housing 4 of the bearing housing 2. The protrusion 2a protrudes in a radial direction of the bearing housing 2. Meanwhile, a protrusion 4a is provided on an outer peripheral surface in the vicinity of the bearing housing 2 of the turbine housing 4. The protrusion 4a protrudes in a radial direction of the turbine housing 4. The protrusion 2a of the bearing housing 2 and the protrusion 4a of the turbine housing 4 are band-fastened and thus fixed to each other by using the fastening mechanism 3. The fastening mechanism 3 is formed from a fastening band (such as a G-coupling) configured to clamp the protrusions 2a and 4a.

A bearing hole 2b is formed in the bearing housing 2. The bearing hole 2b extends in a right-left direction of the turbocharger C and penetrates the bearing housing 2. A semi-floating bearing 7 is provided in this bearing hole 2b, and a shaft 8 is rotatably supported by the semi-floating bearing 7. A turbine wheel 9 is integrally fixed to a left end portion (one end) of the shaft 8. The turbine wheel 9 is rotatably housed in the turbine housing 4. Meanwhile, a compressor wheel 10 is integrally fixed to a right end portion (another end) of the shaft 8. The compressor wheel 10 is rotatably housed in the compressor housing 6.

An intake port 11 is formed in the compressor housing 6. The intake port 11 is opened on the right side of the turbocharger C and is connected to an air cleaner (not shown). Meanwhile, in the state where the bearing housing 2 and the compressor housing 6 are connected to each other by the fastening bolt 5, a diffuser flow passage 12 to boost the air is formed by opposed surfaces of the two housings 2 and 6. The diffuser flow passage 12 is formed annularly from inside to outside in a radial direction of the shaft 8 (the compressor wheel 10), and is connected to the intake port 11 through the compressor wheel 10 on the inside in the radial direction mentioned above.

Moreover, the compressor housing 6 is provided with a compressor scroll flow passage 13. The compressor scroll flow passage 13 is formed annularly and is located outside of the diffuser flow passage 12 in the radial direction of the shaft 8 (the compressor wheel 10). The compressor scroll flow passage 13 is connected to an intake port of an engine (not shown), and is also connected to the diffuser flow passage 12. As a consequence, when the compressor wheel 10 is rotated, the air is taken from the intake port 11 into the compressor housing 6. The air thus taken in is accelerated by the action of a centrifugal force in the process of a flow through spaces between vanes of the compressor wheel 10, then is boosted in the diffuser flow passage 12 and the compressor scroll flow passage 13, and is guided to the intake port of the engine.

The turbine housing 4 is provided with a discharge port 14, which is opened on the left side of the turbocharger C and is connected to an exhaust emission control system (not shown). Moreover, the turbine housing 4 is provided with a flow passage 15, and an annular turbine scroll flow passage 16 located outside of the flow passage 15 in the radial direction of the shaft 8 (the turbine wheel 9). The turbine scroll flow passage 16 is connected to a gas inflow port (not shown) to which exhaust gas discharged from an exhaust manifold of the engine (not shown) is guided, and is also connected to the above-mentioned flow passage 15. As a consequence, the exhaust gas guided from the gas inflow port to the turbine scroll flow passage 16 will then be guided to the discharge port 14 through the flow passage 15 and the turbine wheel 9, and will also rotate the turbine wheel 9 in a flow process thereof. Then, a rotational force of the turbine wheel 9 mentioned above will be transmitted to the compressor wheel 10 through the shaft 8, and the air will be boosted and guided to the intake port of the engine by the rotational force of the compressor wheel 10 as mentioned previously.

Figure 3:
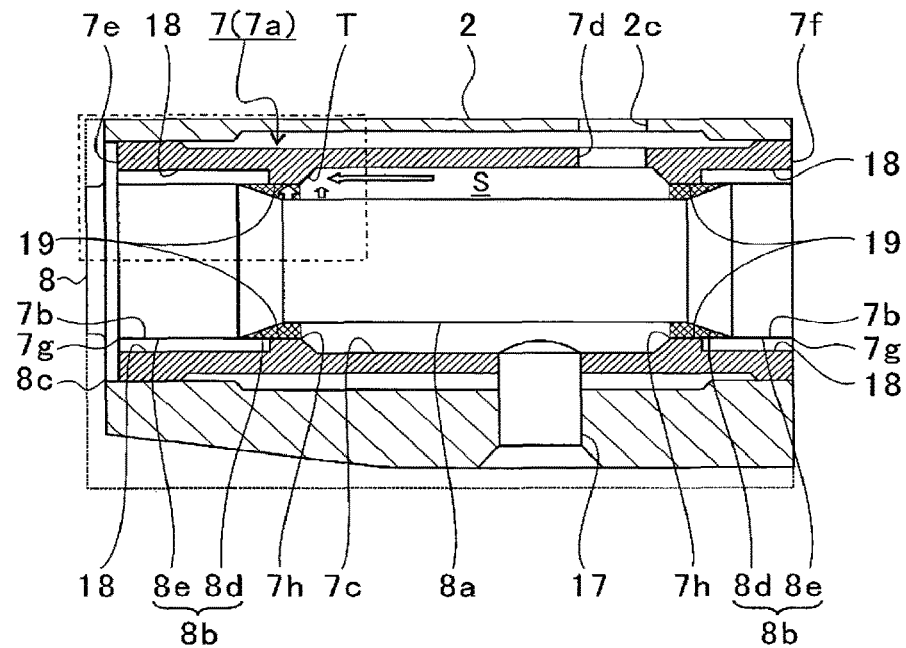
FIG. 3 is a diagram extracting a portion indicated with a dashed line in FIG. 2.

FIG. 3 is a diagram extracting a portion indicated with a dashed line in FIG. 2. As shown in FIG. 3, the semi-floating bearing 7 includes a body 7a of a cylindrical shape, and the shaft 8 is inserted into the body 7a. Two bearing surfaces 7b and 7b are provided on an inner peripheral surface of the body 7a. These bearing surfaces 7b and 7b are located away from each other in a direction of a rotation axis of the shaft 8. In the meantime, a non-bearing surface 7c is formed on the inner peripheral surface of the body 7a. The non-bearing surface 7c is located between the two bearing surfaces 7b and 7b in the direction of the rotation axis of the shaft 8. An inner diameter of each bearing surface 7b is formed into a smaller diameter than an inner diameter of the non-bearing surface 7c.

A small-diameter portion 8a and two large-diameter portions 8b and 8b are formed in a region of the shaft 8 inserted into the body 7a of the semi-floating bearing 7. The large-diameter portions 8b have a larger diameter than that of the small-diameter portion 8a, and are formed on two sides in the direction of the rotation axis of the small-diameter portion 8a, respectively. In the radial direction of the shaft 8, each large-diameter portion 8b is opposed to the corresponding bearing surface 7b of the semi-floating bearing 7. Here, each large-diameter portion 8b includes: a tapered portion 8d continuously formed from a boundary portion with the small-diameter portion 8a; and a parallel portion 8e continuously formed from the tapered portion 8d. An outer diameter of the tapered portion 8d gradually increases while receding from the small-diameter portion 8a. An outer diameter of the parallel portion 8e is equal to a maximum diameter of the tapered portion 8d.

The non-bearing surface 7c of the semi-floating bearing 7 and the shaft 8 are located away from each other in the radial direction of the shaft 8. As a consequence, a gap S is formed inside the body 7a. Moreover, the semi-floating bearing 7 is provided with an oil passage 7d that penetrates the semi-floating bearing 7 in the radial direction of the shaft 8. The oil passage 7d is opposed to an oil passage 2c formed in the bearing housing 2 and is opened to the non-bearing surface 7c, thereby supplying the lubricant oil to the gap S.

Movement of the semi-floating bearing 7 relative to the bearing housing 2 is restricted by a pin 17. When the shaft 8 is rotated, relative rotational movement occurs between each large-diameter portion 8b of the shaft 8 and the corresponding bearing surface 7b of the semi-floating bearing 7. At this time, the lubricant oil supplied to the gap S lubricates the two bearing surfaces 7b, whereby the shaft 8 is rotatably supported by the bearing surfaces 7b.

Meanwhile, the shaft 8 is provided with a collar 8c. The collar 8c is continuously formed on a side of the turbine wheel (the left side in FIG. 3) of the large-diameter portion 8b on the turbine wheel 9 side. The collar 8c has a larger outer diameter than that of the large-diameter portion 8b. The collar 8c is opposed to an end surface 7e on the turbine wheel 9 side in the direction of the rotation axis of the semi-floating bearing 7, and is rotated integrally with the shaft 8. The semi-floating bearing 7 is subjected to a thrust load from the shaft 8 through the collar 8c.

Figure 4:
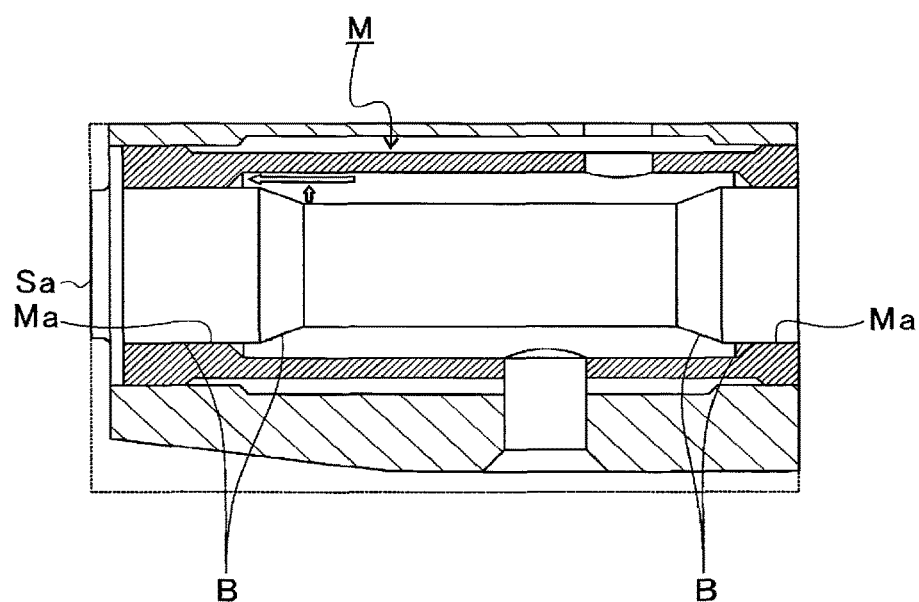
FIG. 4 is a cross-sectional view of a region in a comparative example, in which the region corresponds to the portion depicted in FIG. 3.

FIG. 4 is a cross-sectional view of a region in a comparative example, in which the region corresponds to the portion depicted in FIG. 3. In the comparative example, each large-diameter portion B of a shaft Sa extends more in an approaching direction of two bearing surfaces Ma of a semi-floating bearing M than the corresponding bearing surface Ma does. Here, the approaching direction means a direction in which one of two objects faces the other.

The lubricant oil comes close to the bearing surfaces Ma while flowing in a rotational direction of the shaft Sa along with rotation of the shaft Sa. If the lubricant oil contains foreign substances, such foreign substances are apt to migrate in an axial direction of the shaft Sa as indicated with an outline arrow in FIG. 4 along the flow of the lubricant oil, and also to be directed to an inner peripheral surface side of the semi-floating bearing M due to a centrifugal force. For this reason, the comparative example is at risk of causing part of the foreign substances that contaminate the lubricant oil to reach the bearing surfaces Ma.

On the other hand, in this embodiment, as shown in FIG. 3, each bearing surface 7b extends more in the approaching direction of the two bearing surfaces 7b than does the corresponding tapered portion 8d of the large-diameter portion 8b, which is opposed to the bearing surface 7b in the radial direction.

When the lubricant oil contains the foreign substances, the foreign substances migrate outward in the radial direction of the shaft 8 by the centrifugal force, and also migrate in the axial direction of the shaft 8, and thus come close to each bearing surface 7b. Then, the migration to the bearing surface 7b side is blocked by a tapered portion T formed at a boundary between the bearing surface 7b and the non-bearing surface 7c.

Meanwhile, each of cross-hatched regions in FIG. 3 indicates a clearance formed at a section of a portion where the bearing surface 7b and the shaft 8 are opposed to each other, the section having the outer diameter on the shaft 8 which is made smaller than the maximum diameter. In the clearance, the flow of the lubricant oil in the axial direction of the shaft 8 toward the bearing surface 7b side is diminished by the tapered portion T. Accordingly, a main stream in the clearance is the flow toward the outside in the radial direction rather than the flow in the axial direction of the shaft 8.

For this reason, it is possible to suppress the flow of the lubricant oil in which foreign substances move in the axial direction of the shaft 8 toward the corresponding cross-hatched region. As a consequence, it is possible to inhibit the foreign substances from intruding into the bearing surface 7b of the semi-floating bearing 7 and to improve a performance to repel the foreign substances.

Figure 5:
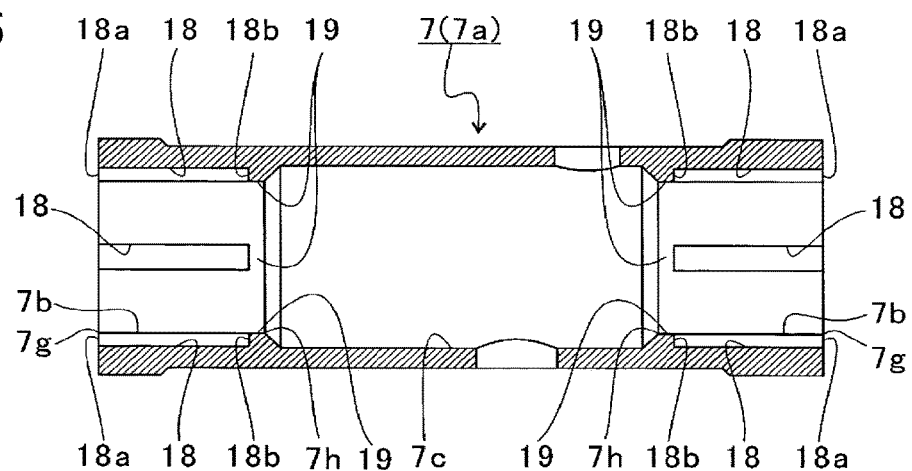
FIG. 5 is a cross-sectional view of a semi-floating bearing according to the embodiment of the present disclosure.

FIG. 5 is a cross-sectional view of the semi-floating bearing 7. As shown in FIG. 5, bearing grooves 18 are formed on the two bearing surfaces 7b, respectively. Four bearing grooves 18 are provided at regular intervals in the circumferential direction, which are at intervals of approximately 90°, on each bearing surface 7b.

Here, each bearing groove 18 extends parallel to the axial direction of the shaft 8. One end 18a of the bearing groove 18 is located on an end portion 7g side in a receding direction of the two bearing surfaces 7b, while another end 18b of the bearing groove 18 is located on an end portion 7h side in the approaching direction of the two bearing surfaces 7b.

In addition, non-groove portions 19 are provided to the two bearing surfaces 7b, respectively. The non-groove portions 19 are regions which are adjacent to the other ends 18b of the two bearing grooves 18 in the approaching direction, and are flush with the bearing surfaces 7b.

As shown in FIG. 3, each bearing groove 18 extends beyond the parallel portion 8e of the large-diameter portion 8b in the approaching direction of the two bearing surfaces 7b. For this reason, even if some of the foreign substances are retained in the cross-hatched region in FIG. 3, it is possible to inhibit the foreign substances from intruding into the bearing surface 7b of the semi-floating bearing 7.

Moreover, by forming the non-groove portion 19, the bearing groove 18 does not penetrate the bearing surface 7b to the tapered portion T formed at the boundary between the bearing surface 7b and the non-bearing surface 7c. Thus, it is possible to inhibit the foreign substances retained at the tapered portion T from intruding into the bearing groove 18.

Figure 6:
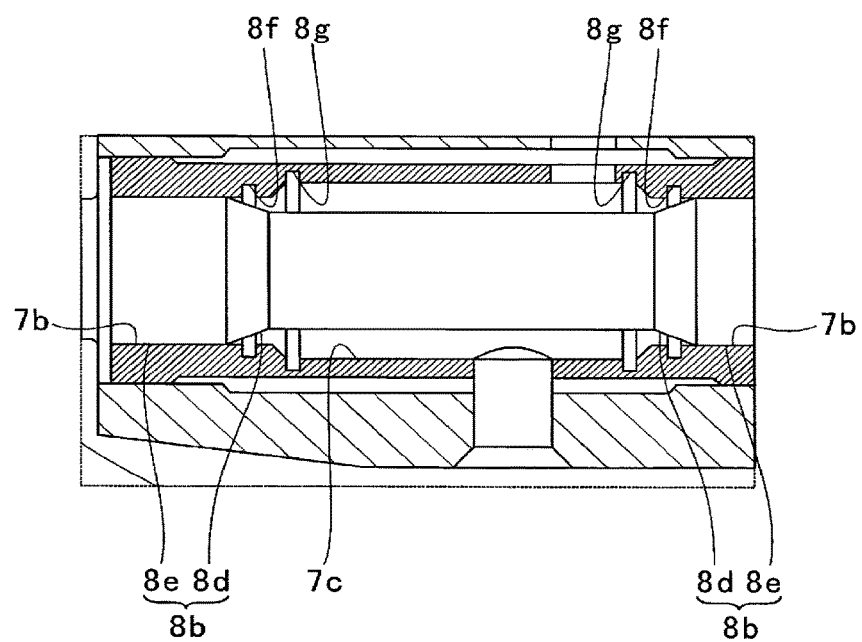
FIG. 6 is a cross-sectional view of a region according to a first modified example of the embodiment of the present disclosure, in which the region corresponds to the portion depicted in FIG. 3.

FIG. 6 is a cross-sectional view of a region according to a first modified example of this embodiment, in which the region corresponds to the portion depicted in FIG. 3. As shown in FIG. 6, in the first modified example, a groove 8f recessed in a radial direction of the semi-floating bearing 7 is formed in a region of the bearing surface 7b, which extends toward the center in the direction of the rotation axis from the parallel portion 8e of the large-diameter portion 8b that is opposed in the radial direction. The groove 8f extends in a circumferential direction of the semi-floating bearing 7 and is formed annularly, for example.

Meanwhile, a groove 8g recessed in the radial direction of the semi-floating bearing 7 is formed in the non-bearing surface 7c. As with the above-described groove 8f, the groove 8g extends in the circumferential direction of the semi-floating bearing 7 and is formed annularly, for example.

The lubricant oil flows while whirling by the rotation of the shaft 8. Therefore, if the lubricant oil contains the foreign substances, the foreign substances also whirl together with the lubricant oil and come close to an inner peripheral surface of the semi-floating bearing 7 by the centrifugal force. By providing the grooves 8f and 8g as described above, the foreign substances coming close to the inner peripheral surface intrude into the grooves 8f and 8g and are blocked by wall surfaces of the grooves 8f and 8g, thereby being inhibited from advancing to bearing surface 7b side.

Figure 7:
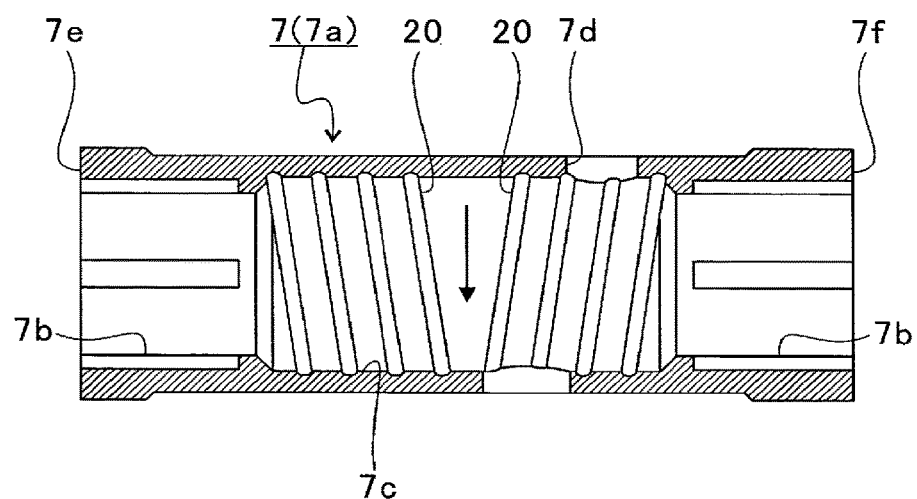
FIG. 7 is a cross-sectional view of a semi-floating bearing according to a second modified example of the embodiment of the present disclosure.

FIG. 7 is a cross-sectional view of a semi-floating bearing according to a second modified example of this embodiment. Although illustration of the shaft 8 is omitted in FIG. 7, as with the above-described embodiment, each bearing surface 7b in the second modified example also extends more in the approaching direction of the two bearing surfaces 7b than does the corresponding large-diameter portion 8b out of the two large-diameter portions 8b, which is opposed to the bearing surface 7b in the radial direction.

Moreover, in the second modified example, blocking portions 20 are further provided in the non-bearing surface 7c of the semi-floating bearing 7 as shown in FIG. 7. The blocking portions 20 are formed as grooves recessed in the radial direction of the semi-floating bearing 7, and are inclined with respect to the circumferential direction of the shaft 8. Specifically, each blocking portion 20 is inclined in such a direction that a front side in a rotational direction of the shaft 8 (a downward direction indicated with an arrow in FIG. 7) of the blocking portion 20 comes closer to the center side in the direction of the rotation axis of the semi-floating bearing 7, or in other words, in a direction to recede from the corresponding bearing surface 7b. For this reason, if the foreign substances contained in the lubricant oil migrate forward in the rotational direction of the shaft 8 along with the rotation of the shaft 8, the foreign substances will be guided toward the center side in the direction of the rotation axis of the semi-floating bearing 7 along the blocking portions 20, i.e., in the directions to recede from the bearing surfaces 7b.

In the meantime, each blocking portion 20 is formed helically, so that the foreign substances are guided toward the center side in the direction of the rotation axis of the semi-floating bearing 7 without coming off the blocking portions 20. As described above, each blocking portion 20 blocks the advance of the foreign substances, which are contained in the lubricant oil supplied to the gap S, to the corresponding bearing surface 7b side (the end surface 7e or 7f side of the semi-floating bearing 7 in FIG. 7).

Figure 8:
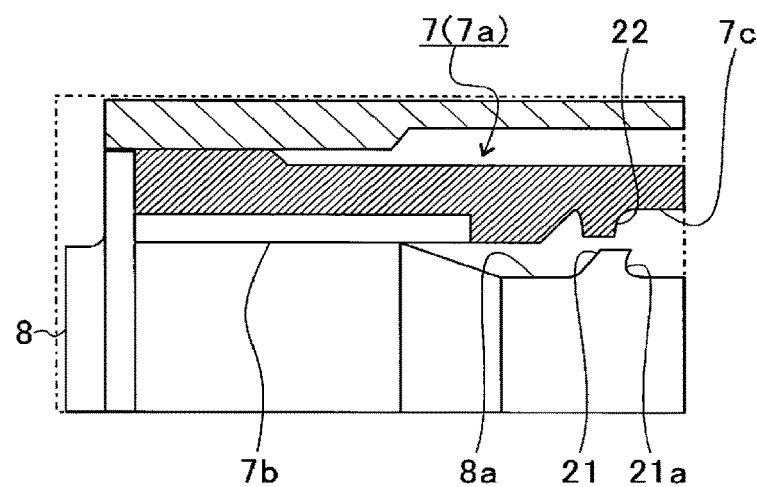
FIG. 8 is a cross-sectional view of a region according to a third modified example of the embodiment of the present disclosure, in which the region corresponds to a portion indicated with a chain dashed line in FIG. 3.

FIG. 8 is a cross-sectional view of a region according to a third modified example of the embodiment of the present disclosure, in which the region corresponds to a portion indicated with a chain dashed line in FIG. 3. At the small-diameter portion 8a of the shaft 8, an outer peripheral protrusion 21 protruding in the radial direction extends in the circumferential direction of the shaft 8.

Moreover, a tip end in the radial direction of the outer peripheral protrusion 21 extends from a base end in the radial direction of the outer peripheral protrusion 21 in the approaching direction (to a right side in FIG. 8) of the two bearing surfaces 7b. In other words, a side surface 21a on the right side of the outer peripheral protrusion 21 in FIG. 8 is formed into a shape of an overhang.

Furthermore, a blocking portion 22 is formed on the non-bearing surface 7c. The blocking portion 22 is formed as a protrusion which protrudes in the radial direction of the semi-floating bearing 7. The outer peripheral protrusion 21 is opposed to the blocking portion 22 in the radial direction. Moreover, the tip end of the outer peripheral protrusion 21 extends to a right side of a tip end of the blocking portion 22 in FIG. 8.

In the third modified example as well, the foreign substances contained in the lubricant oil directed from the oil passage 7d to the bearing surface 7b stagnate by an influence of the blocking portion 22, and are therefore unlikely to reach the bearing surface 7b. In the meantime, the foreign substances may drift around the outer peripheral surface of the shaft 8 depending on the flow of the lubricant oil. In this case, however, it is possible to guide the foreign substances, which come close to the side surface 21a of the outer peripheral protrusion 21 by means of the outer peripheral protrusion 21, to such a direction to recede from the bearing surface 7b while using the blocking portion 22.

The embodiment and the modified examples mentioned above have described the case in which each of the two bearing surfaces 7b extends more in the approaching direction of the two bearing surfaces 7b than does the corresponding one of the two large-diameter portions 8b, which is opposed to the bearing surface 7b in the radial direction. However, only one bearing surface 7b of the two bearing surfaces 7b may extend more in the approaching direction of the two bearing surfaces 7b than does the large-diameter portion 8b opposed to the bearing surface 7b in the radial direction. In this case, the bearing grooves 18 formed on the one of the bearing surfaces 7b may extend more in the approaching direction of the two bearing surfaces 7b than does the corresponding parallel portion 8e of the large-diameter portion 8b. Meanwhile, the non-groove portion 19 may be formed adjacent to each bearing groove 18 formed in the one of the bearing surfaces 7b. In the meantime, the groove 8g may be formed in a region of the one of the bearing surfaces 7b extending more to the center side in the direction of the rotation axis than does the parallel portion 8e of the large-diameter portion 8b opposed in the radial direction.

Meanwhile, although the above-mentioned embodiment has described the case of providing the bearing grooves 18, the bearing grooves 18 are not essential constituents. In the meantime, even when the bearing grooves 18 are provided, the non-groove portions 19 do not always have to be provided.

Meanwhile, the above-mentioned first modified example has described the case of providing both of the grooves 8f and 8g. However, only one of the grooves 8f and 8g may be provided instead.

Meanwhile, the above-mentioned second modified example has described the case in which the rotational direction of the shaft 8 is clockwise when viewed from the compressor wheel 10 side. However, the rotational direction of the shaft 8 may be counterclockwise when viewed from the compressor wheel 10 side.

Meanwhile, in the embodiment and the modified examples mentioned above, there is provided the collar 8c to be rotated integrally with the shaft 8, and the semi-floating bearing 7 is subjected to the thrust load from the shaft 8 through the collar 8c. However, the collar 8c is not essential in the embodiment and the modified examples mentioned above. Nonetheless, when the collar 8c is provided and the semi-floating bearing 7 is subjected to the thrust load, a configuration may be adopted in which each bearing surface 7b extends more in the approaching direction of the two bearing surfaces 7b than the large-diameter portion 8b does, so as to suppress the migration of the foreign substances to the bearing surface 7b side, because of a narrow gap between the end surface 7e of the semi-floating bearing 7 and the collar 8c.

Meanwhile, if a failure occurs in the filter unit 106 of the turbocharger oil supply system 100, the lubricant oil having bypassed the filter unit 106 is supplied to the turbocharger C. In such a case, the lubricant oil is likely to contain more foreign substances. On this occasion, a larger amount of the foreign substances than usual presumably intrude from the oil passage 7d into the gap S. Even in that case, according to the embodiment and the modified examples mentioned above, it is possible to minimize the intrusion of the foreign substance into the bearing surfaces 7b and to secure a longer time period for achieving normal operation.

While the embodiment of the present disclosure has been described above with reference to the accompanying drawings, it is needless to say that the present disclosure is not limited only to this embodiment. It is obvious for a person skilled in the art that he or she can arrive at various changes or modifications within the scope as defined in the claims. It should be understood that such changes and modifications also naturally belong to the technical scope of the present disclosure.

What is claimed is:

1. A turbocharger comprising:
a turbocharger body;
a shaft housed in the turbocharger body and provided with wheels on two ends of the shaft, the shaft including
a small-diameter portion, and
two large-diameter portions formed on two sides in a direction of a rotation axis of the small-diameter portion, respectively, and each having a larger diameter than a diameter of the small-diameter portion, each large-diameter portion includes:
a tapered portion continuously formed from a boundary portion with the small-diameter portion, the tapered portion having an outer diameter gradually increasing while receding from the small-diameter portion, and
a parallel portion continuously formed from the tapered portion, the parallel portion having an outer diameter equal to a maximum diameter of the tapered portion; and
a semi-floating bearing including
a body of a cylindrical shape into which the shaft is to be inserted,
two bearing surfaces formed on an inner peripheral surface of the body, opposed to the large-diameter portions of the shaft, and configured to rotatably support the shaft,
a non-bearing surface formed on the inner peripheral surface of the body, located between the two bearing surfaces, and having a larger inner diameter than inner diameters of the bearing surfaces, and
an oil passage opened to the non-bearing surface and configured to supply lubricant oil to a gap in a radial direction between the non-bearing surface and the shaft, such that the lubricant oil supplied to the gap lubricates the two bearing surfaces, wherein
at least one of the two bearing surfaces continuously extends in a circumferential direction of the semi-floating bearing and continuously extends more in an approaching direction of the two bearing surfaces than the large-diameter portion opposed in the radial direction to the one bearing surface extends.

2. The turbocharger according to claim 1, wherein
a groove is formed on the non-bearing surface,
the groove is recessed in the radial direction from an inner peripheral surface of the semi-floating bearing, and extends in the circumferential direction of the semi-floating bearing.

3. The turbocharger according to claim 1, wherein
a collar configured to be rotated integrally with the shaft is provided on a side of at least one end surface of two end surfaces in the direction of the rotation axis of the semi-floating bearing,
the collar is opposed to the one end surface, and
the semi-floating bearing is subjected to a thrust load from the shaft through the collar.

4. The turbocharger according to claim 1, wherein
each of the two bearing surfaces extends more in the approaching direction of the two bearing surfaces than the large-diameter portion opposed in the radial direction to the one bearing surface extends.

5. A turbocharger comprising:
a turbocharger body;
a shaft housed in the turbocharger body and provided with wheels on two ends of the shaft, the shaft including
  a small-diameter portion, and
  two large-diameter portions formed on two sides in a direction of a rotation axis of the small-diameter portion, respectively, and each having a larger diameter than a diameter of the small-diameter portion; and
a semi-floating bearing including
  a body of a cylindrical shape into which the shaft is to be inserted,
  two bearing surfaces formed on an inner peripheral surface of the body, opposed to the large-diameter portions of the shaft, and configured to rotatably support the shaft,
  a non-bearing surface formed on the inner peripheral surface of the body, located between the two bearing surfaces, and having a larger inner diameter than inner diameters of the bearing surfaces, and
  an oil passage opened to the non-bearing surface and configured to supply lubricant oil to a gap in a radial direction between the non-bearing surface and the shaft, such that the lubricant oil supplied to the gap lubricates the two bearing surfaces, wherein
at least one of the two bearing surfaces extends more in an approaching direction of the two bearing surfaces than the large-diameter portion opposed in the radial direction to the one bearing surface extends,
each large-diameter portion includes:
  a tapered portion continuously formed from a boundary portion with the small-diameter portion, the tapered portion having an outer diameter gradually increasing while receding from the small-diameter portion; and
  a parallel portion continuously formed from the tapered portion, the parallel portion having an outer diameter equal to a maximum diameter of the tapered portion,
a bearing groove is formed on the one bearing surface extending more in the approaching direction than the large-diameter portion opposed in the radial direction to the one bearing surface extends,
the bearing groove has one end located on an end portion side in a receding direction of the two bearing surfaces, and another end located on an end portion side in the approaching direction, and
the bearing groove extends beyond the parallel portion of the large-diameter portion in the approaching direction.

6. The turbocharger according to claim 5, wherein
a non-groove portion is formed on the bearing surface extending more in the approaching direction than the large-diameter portion opposed in the radial direction to the one bearing surface extends, and
the non-groove portion is adjacent to the other end of the bearing groove and being flush with the bearing surface.

7. The turbocharger according to claim 6, wherein
a groove is formed on a region in the one bearing surface extending more in the approaching direction than the large-diameter portion opposed in the radial direction to the one bearing surface extends, the region extending in the approaching direction beyond the parallel portion of the large-diameter portion opposed in the radial direction to the one bearing surface, and
the groove is recessed in the radial direction from an inner peripheral surface of the semi-floating bearing and extends in a circumferential direction of the semi-floating bearing.

8. The turbocharger according to claim 5, wherein
a groove is formed on a region in the one bearing surface extending more in the approaching direction than the large-diameter portion opposed in the radial direction to the one bearing surface extends, the region extending in the approaching direction beyond the parallel portion of the large-diameter portion opposed in the radial direction to the one bearing surface, and
the groove is recessed in the radial direction from an inner peripheral surface of the semi-floating bearing and extends in a circumferential direction of the semi-floating bearing.

9. The turbocharger according to claim 5, wherein
a groove is formed on the non-bearing surface,
the groove is recessed in the radial direction from an inner peripheral surface of the semi-floating bearing, and extends in a circumferential direction of the semi-floating bearing.

10. The turbocharger according to claim 5, wherein
a collar configured to be rotated integrally with the shaft is provided on a side of at least one end surface of two end surfaces in the direction of the rotation axis of the semi-floating bearing,
the collar is opposed to the one end surface, and
the semi-floating bearing is subjected to a thrust load from the shaft through the collar.

11. The turbocharger according to claim 5, wherein
each of the two bearing surfaces extends more in the approaching direction of the two bearing surfaces than the large-diameter portion opposed in the radial direction to the one bearing surface extends.

12. A turbocharger oil supply system comprising:
a reservoir unit configured to reserve lubricant oil;
a pump configured to send the lubricant oil out of the reservoir unit;
a filter unit configured to remove a foreign substance from the lubricant oil sent out by the pump;
a turbocharger to which the lubricant oil deprived of the foreign substance by the filter unit is to be supplied; and
a valve configured to open and close an oil passage configured to supply the lubricant oil sent out by the pump to the turbocharger while bypassing the filter unit, wherein
the turbocharger includes
  a turbocharger body,
  a shaft housed in the turbocharger body and provided with wheels on two ends of the shaft, the shaft including
    a small-diameter portion, and
    two large-diameter portions formed on two sides in a direction of a rotation axis of the small-diameter portion, respectively, and each having a larger diameter than a diameter of the small-diameter portion, each large-diameter portion includes:
- a tapered portion continuously formed from a boundary portion with the small-diameter portion, the tapered portion having an outer diameter gradually increasing while receding from the small-diameter portion; and
- a parallel portion continuously formed from the tapered portion, the parallel portion having an outer diameter equal to a maximum diameter of the tapered portion, and a semi-floating bearing including
- a body of a cylindrical shape into which the shaft is to be inserted,
- two bearing surfaces formed on an inner peripheral surface of the body, opposed to the large-diameter portions of the shaft, and configured to rotatably support the shaft,
- a non-bearing surface formed on the inner peripheral surface of the body, located between the two bearing surfaces, and having a larger inner diameter than inner diameters of the bearing surfaces, and
- an oil passage opened to the non-bearing surface and configured to supply the lubricant oil to a gap in a radial direction between the non-bearing surface and the shaft, such that the lubricant oil supplied to the gap lubricates the two bearing surfaces, and wherein at least one of the two bearing surfaces continuously extends in a circumferential direction of the semi-floating bearing and continuously extends more in an approaching direction of the two bearing surfaces than the large-diameter portion opposed in the radial direction to the one bearing surface extends.

13. The turbocharger oil supply system according to claim 12, wherein
each of the two bearing surfaces extends more in the approaching direction of the two bearing surfaces than the large-diameter portion opposed in the radial direction to the one bearing surface extends.

14. A turbocharger oil supply system comprising:
a reservoir unit configured to reserve lubricant oil;
a pump configured to send the lubricant oil out of the reservoir unit;
a filter unit configured to remove a foreign substance from the lubricant oil sent out by the pump;
a turbocharger to which the lubricant oil deprived of the foreign substance by the filter unit is to be supplied; and
a valve configured to open and close an oil passage configured to supply the lubricant oil sent out by the pump to the turbocharger while bypassing the filter unit, wherein the turbocharger includes
a turbocharger body,
a shaft housed in the turbocharger body and provided with wheels on two ends of the shaft, the shaft including
- a small-diameter portion, and
- two large-diameter portions formed on two sides in a direction of a rotation axis of the small-diameter portion, respectively, and each having a larger diameter than a diameter of the small-diameter portion, and a semi-floating bearing including
- a body of a cylindrical shape into which the shaft is to be inserted,
- two bearing surfaces formed on an inner peripheral surface of the body, opposed to the large-diameter portions of the shaft, and configured to rotatably support the shaft,
- a non-bearing surface formed on the inner peripheral surface of the body, located between the two bearing surfaces, and having a larger inner diameter than inner diameters of the bearing surfaces, and
- an oil passage opened to the non-bearing surface and configured to supply the lubricant oil to a gap in a radial direction between the non-bearing surface and the shaft, such that the lubricant oil supplied to the gap lubricates the two bearing surfaces, at least one of the two bearing surfaces extends more in an approaching direction of the two bearing surfaces than the large-diameter portion opposed in the radial direction to the one bearing surface extends, each large-diameter portion includes:
- a tapered portion continuously formed from a boundary portion with the small-diameter portion, the tapered portion having an outer diameter gradually increasing while receding from the small-diameter portion; and
- a parallel portion continuously formed from the tapered portion, the parallel portion having an outer diameter equal to a maximum diameter of the tapered portion, a bearing groove is formed on the one bearing surface extending more in the approaching direction than the large-diameter portion opposed in the radial direction to the one bearing surface extends,
the bearing groove has one end located on an end portion side in a receding direction of the two bearing surfaces, and another end located on an end portion side in the approaching direction, and
the bearing groove extends beyond the parallel portion of the large-diameter portion in the approaching direction.

15. The turbocharger oil supply system according to claim 14, wherein
each of the two bearing surfaces extends more in the approaching direction of the two bearing surfaces than the large-diameter portion opposed in the radial direction to the one bearing surface extends.

* * * * *